United States Patent
Cherniavsky et al.

(10) Patent No.: US 10,015,744 B2
(45) Date of Patent: Jul. 3, 2018

(54) LOW POWER OPERATIONS IN A WIRELESS TUNNELING TRANSCEIVER

(71) Applicant: QUALCOMM INCORPORATED, San Diego, CA (US)

(72) Inventors: Dmitry Cherniavsky, San Jose, CA (US); Chinh Huy Doan, San Jose, CA (US); Wen Fan, Santa Clara, CA (US); Mark Forbes, San Carlos, CA (US); Brian Henry John, San Jose, CA (US); Nishit Kumar, San Jose, CA (US); James Ray Parker, Palo Alto, CA (US)

(73) Assignee: QUALCOMM Incorporated, San Diego, CA (US)

(*) Notice: Subject to any disclaimer, the term of this patent is extended or adjusted under 35 U.S.C. 154(b) by 56 days.

(21) Appl. No.: 14/589,925

(22) Filed: Jan. 5, 2015

(65) Prior Publication Data
US 2016/0198410 A1  Jul. 7, 2016

(51) Int. Cl.
*H04W 52/02* (2009.01)
*H04W 76/02* (2009.01)

(52) U.S. Cl.
CPC ...... *H04W 52/0229* (2013.01); *H04W 76/023* (2013.01); *Y02B 60/50* (2013.01)

(58) Field of Classification Search
CPC .................................................. H04W 52/0229
USPC ........................................................ 370/278
See application file for complete search history.

(56) References Cited

U.S. PATENT DOCUMENTS

| | | | | |
|---|---|---|---|---|
| 4,475,228 A * | 10/1984 | Vickers | .................... | G10H 1/12 463/35 |
| 6,975,665 B1 * | 12/2005 | McCorkle | ............ | H04B 1/7163 375/130 |
| 8,452,995 B1 * | 5/2013 | Lachwani | ............... | G06F 1/266 713/320 |
| 8,947,892 B1 * | 2/2015 | Lam | ..................... | H05K 9/0086 174/357 |
| 2003/0021296 A1 * | 1/2003 | Wee | ........................ | H04L 29/06 370/474 |
| 2004/0013099 A1 * | 1/2004 | O'Neill | ............... | H04L 12/4633 370/338 |
| 2005/0265428 A1 * | 12/2005 | McCorkle | ............... | G01S 7/023 375/130 |
| 2006/0232437 A1 | 10/2006 | Gutowski et al. | | |

(Continued)

*Primary Examiner* — Mang Yeung
*Assistant Examiner* — Peter G Solinsky
(74) *Attorney, Agent, or Firm* — Holland & Hart LLP/Qualcomm

(57) ABSTRACT

A wireless tunneling system tunnels communications between a first host device and a second host device through a wireless link, while maintaining compliance of the communications between the first and second host devices with a wired communication protocol and operates in a power efficient manner. Two host devices may communicate with each other through a wireless link using the wireless tunneling system, as if two host devices were connected through the wired cable. The wireless tunneling system operates in one of a high power state and one or more low power states. In the high power state, the wireless tunneling system exchanges data at a higher data rate for tunneling. In the low power state, the wireless tunneling system disables power hungry components for conserving power.

18 Claims, 11 Drawing Sheets

(56) References Cited

U.S. PATENT DOCUMENTS

| | | | |
|---|---|---|---|
| 2006/0293079 A1* | 12/2006 | Bahl | H04W 52/0277 455/552.1 |
| 2007/0073842 A1* | 3/2007 | Uehara | H04W 4/08 709/218 |
| 2007/0260905 A1* | 11/2007 | Marsden | G06F 1/3215 713/323 |
| 2007/0283075 A1* | 12/2007 | Patton | H04L 12/66 710/315 |
| 2008/0019347 A1* | 1/2008 | Shin | H04W 48/08 370/345 |
| 2009/0010233 A1* | 1/2009 | Pratt, Jr. | G01D 21/00 370/338 |
| 2009/0176489 A1* | 7/2009 | Ulupinar | H04W 36/0016 455/432.2 |
| 2009/0213915 A1 | 8/2009 | Wagner | |
| 2010/0027514 A1* | 2/2010 | Higashide | G06F 13/387 370/337 |
| 2010/0070665 A1* | 3/2010 | Swaminathan | G06F 1/3209 710/106 |
| 2010/0109931 A1* | 5/2010 | Esnard | H01F 38/14 341/176 |
| 2010/0214999 A1* | 8/2010 | Kubo | H04W 56/001 370/329 |
| 2010/0322126 A1* | 12/2010 | Krishnaswamy | H04W 48/16 370/311 |
| 2011/0103609 A1* | 5/2011 | Pelland | H04M 1/0254 381/74 |
| 2011/0115986 A1* | 5/2011 | Takezaki | H04N 21/43637 348/734 |
| 2011/0122921 A1* | 5/2011 | McCorkle | H04B 1/7174 375/130 |
| 2011/0235284 A1* | 9/2011 | Huang | H05K 1/0268 361/748 |
| 2011/0286504 A1* | 11/2011 | Wang | G06F 1/3203 375/222 |
| 2012/0071710 A1* | 3/2012 | Gazdzinski | A61B 1/00016 600/101 |
| 2012/0224485 A1* | 9/2012 | Payyappilly | H04L 12/4633 370/235 |
| 2012/0258666 A1* | 10/2012 | Kasami | H04W 4/008 455/41.2 |
| 2013/0010848 A1* | 1/2013 | Shimizu | H04L 5/06 375/219 |
| 2013/0104207 A1* | 4/2013 | Kroeselberg | H04W 12/06 726/6 |
| 2013/0138389 A1* | 5/2013 | Gyongy | A61B 5/1118 702/141 |
| 2013/0157729 A1* | 6/2013 | Tabe | H04W 52/0245 455/573 |
| 2013/0196703 A1* | 8/2013 | Masoud | G06F 19/3418 455/512 |
| 2013/0203463 A1* | 8/2013 | Kent | G06F 1/325 455/556.1 |
| 2013/0313446 A1* | 11/2013 | Yamazaki | H04B 10/802 250/551 |
| 2014/0013018 A1* | 1/2014 | Sella | G06F 13/4295 710/106 |
| 2014/0035650 A1* | 2/2014 | Zerbe | H03L 7/06 327/299 |
| 2014/0101345 A1* | 4/2014 | Ranta | G06F 13/4081 710/16 |
| 2014/0173036 A1* | 6/2014 | Das | H04L 65/602 709/219 |
| 2014/0213306 A1* | 7/2014 | Blankenship | H04B 5/0031 455/457 |
| 2014/0254349 A1* | 9/2014 | Jia | H04W 28/04 370/225 |
| 2014/0270212 A1* | 9/2014 | Ridler | H04R 25/30 381/60 |
| 2014/0354305 A1* | 12/2014 | Hanssen | H03K 17/9622 324/661 |
| 2015/0023161 A1* | 1/2015 | Alisawi | H04W 28/0236 370/230 |
| 2015/0077225 A1* | 3/2015 | Proefke | G07C 9/00182 340/5.72 |
| 2015/0193726 A1* | 7/2015 | Simmons | G06Q 10/087 705/28 |
| 2015/0237183 A1* | 8/2015 | Novet | H04M 1/72569 455/556.1 |
| 2015/0362974 A1* | 12/2015 | Chau | G06F 1/324 713/322 |
| 2016/0190996 A1* | 6/2016 | Searle | H03F 1/0277 330/295 |
| 2016/0277212 A1* | 9/2016 | Forbes | H04L 5/14 |
| 2016/0278141 A1* | 9/2016 | Emami | H04W 76/022 |
| 2016/0278142 A1* | 9/2016 | Babbage, II | H04L 25/00 |

* cited by examiner

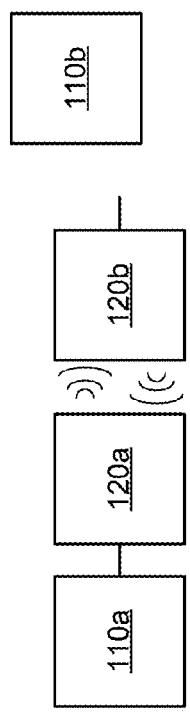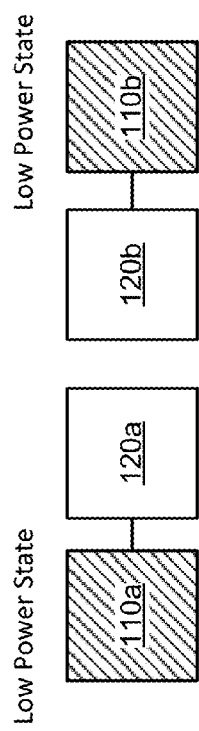

LOW POWER OPERATIONS IN A WIRELESS TUNNELING TRANSCEIVER

BACKGROUND

1. Field of the Disclosure

Embodiments of the present disclosure generally relate to the field of wireless devices and, more particularly, to a transceiver architecture for wireless tunneling.

2. Description of the Related Art

In a wireless tunneling system, data that is traditionally communicated over a wired communication link is instead tunneled through a wireless channel. Conventionally, wireless communications are substantially slower than communications over wired links. However, advanced wireless technologies such as 60 GHz wireless communication systems are capable of transferring at multi-Gigabit data rates suitable for traditionally wired protocols such as Universal Serial Bus (USB), High-Definition Media Interface (HDMI), and DisplayPort (DP). Nevertheless, because of the high power consumption of high frequency wireless transmissions, a challenge exists in developing a commercially viable wireless tunneling system suitable for battery-powered devices such as mobile phones.

SUMMARY

A disclosed wireless tunneling system tunnels communications between a first host device and a second host device through a wireless link, while maintaining compliance of the communications between the first and second host devices with a wired communication protocol, and operates in a power efficient manner.

In one embodiment, the wireless tunneling system includes at least two full-duplex transceiver devices that communicate with each other through the wireless link. A first full-duplex transceiver device is coupled to the first host device and a second full-duplex transceiver device is coupled to the second host device. Two host devices may communicate with each other through the wireless link using two full-duplex transceivers as if the two host devices were connected through a wired cable.

Each transceiver device includes a transmitter, a receiver, and a state machine. The transmitter and the receiver operate in one of a high power state and one or more low power states, according to the state machine. In the high power state, the transmitter and the receiver transmit and receive data at a higher data rate. The transmitter and the receiver operating in the high power state render higher power consumption than operating in any of the one or more low power states. In one aspect, the transmitter and the receiver operate in the high power state for tunneling communications between two host devices through the wireless link. In the one or more low power states, the transmitter and the receiver transmit and receive data at a lower data rate, attempt to communicatively engage with another device, and/or disable power hungry components.

The transmitter includes a high frequency transmitting circuit, a low frequency transmitting circuit, and an up-converter. The high frequency transmitting circuit is operational in the high power state to receive transmit data from the first host device and to encode the transmit data in a first transmit baseband signal at a first data rate. The transmit data is targeted for the second host device and compliant with the wired communication protocol. The high frequency transmitting circuit may be disabled in the one or more low power states.

The low frequency transmitting circuit is operational in the one or more low power states to generate a second transmit baseband signal at a second data rate lower than the first data rate. The second transmit baseband signal includes control information.

The up-converter circuit receives the first transmit baseband signal when in the high power state and receives the second transmit baseband signal when in the one or more low power states. The up-converter circuit modulates the first or second transmit baseband signal onto a carrier signal to generate a wireless transmit signal for transmitting.

The receiver includes a down-converter circuit, a high frequency receiving circuit, and a low frequency receiving circuit. The down-converter circuit receives a wireless receive signal and demodulates the wireless receive signal to generate a receive baseband signal.

The high frequency receiving circuit is operational in the high power state to receive the receive baseband signal. The high frequency receiving circuit decodes the receive baseband signal to obtain receive data for providing to the first host device. The receive data is compliant with the wired communication protocol. The high frequency receiving circuit may be disabled when in the one or more low power states.

The low frequency receiving circuit is operational in the one or more low power states to receive the receive baseband signal and to generate a control signal based on control information in the receive baseband signal. The state machine controls switching of the transceiver device between the high power state and the one or more low power states based in part on the control signal.

In one exemplary embodiment, the wireless tunneling system generates a baseband signal with an envelope having an on-period to indicate a state of a transmitting one of the transceiver devices, or cause an operation at a receiving one of the transceiver devices to be performed. In a transmitting one of the transceiver devices, a state machine determines an on-period of an envelope of the transmit baseband signal based on a state of the state machine.

In one exemplary embodiment, the down-converter circuit includes an envelope detector. The envelope detector filters out high frequency components of the wireless receive signal to generate the receive baseband signal. The low frequency receiving circuit determines an on-period of an envelope of the receive baseband signal, and the state machine controls an operation state of the transceiver device based at least in part of the determined on-period.

In one exemplary embodiment, the low frequency transmitting circuit includes an envelope generator circuit to generate an envelope signal in which an on-period of the envelope signal encodes one of a plurality of wake-up events. In addition, the low frequency transmitting circuit includes a pseudo random binary sequence generator to generate a plurality of pulses having pseudo-randomly varying pulse widths. Moreover, the low frequency transmitting circuit includes a logic circuit to generate the second transmit baseband signal by outputting a constant voltage to represent an off-period of the envelope signal and by outputting the plurality of pulses to represent the on-period of the envelope signal.

In one embodiment, the state machine periodically enables the low frequency transmitting circuit and the low frequency receiving circuit to detect another transceiver device within a predetermined proximity. In the proximity detection state, the high frequency transmitting and receiving circuits may be disabled. The state machine may enter the high power state responsive to detecting another device within the predetermined proximity.

In one exemplary embodiment, at least one of the transceiver devices includes a mechanical switch that is activated based on physical proximity to a second transceiver device. When activated, the state machine is released out of a reset and causes the transceiver to initiate a proximity detection process to detect the second transceiver quickly.

BRIEF DESCRIPTION OF THE DRAWINGS

The teachings of the embodiments disclosed herein can be readily understood by considering the following detailed description in conjunction with the accompanying drawings.

FIGS. 4A, 4B, and 4C illustrate example scenarios in which low frequency signaling can be used to facilitate improved power efficiency in the wireless tunneling system.

DETAILED DESCRIPTION

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIG.) and the following description relate to the preferred embodiments by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 1:
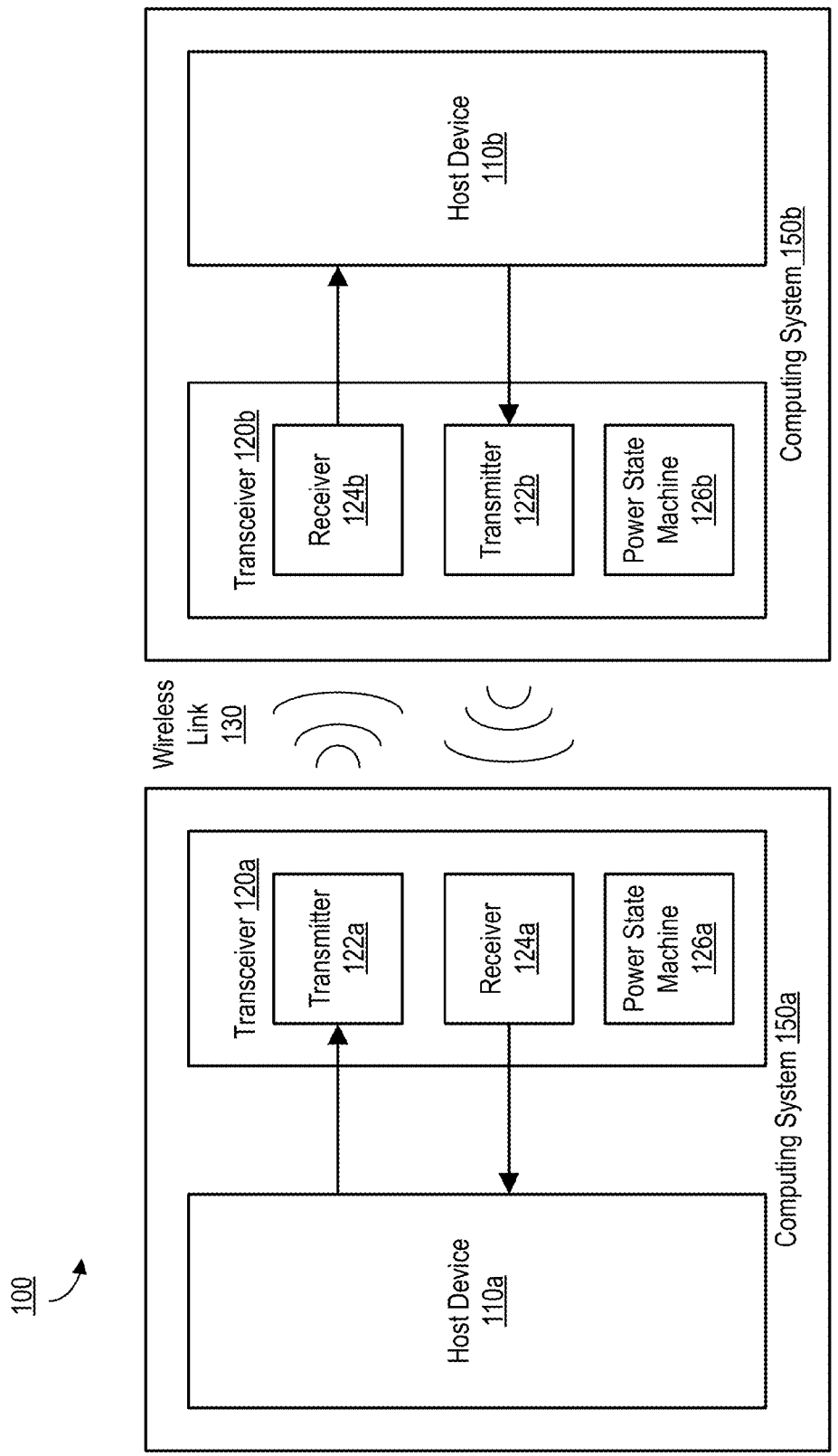
FIG. 1 illustrates one embodiment of a wireless tunneling system.

FIG. 1 illustrates an embodiment of a wireless tunneling system 100. The wireless tunneling system 100 comprises a first computing system 150a communicating with a second computing system 150b via a wireless link 130. Each computing system 150a, 150b (generally referred to herein as a computing system 150) comprises a transceiver 120a, 120b (generally referred to herein as a transceiver 120) coupled to a respective host device 110a, 110b (generally referred to herein as a host device 110). In one embodiment, the wireless tunneling system 100 provides a replacement for conventional wired communications such as USB, HDMI, DisplayPort, or other serial communication protocols. For example, rather than host devices 110a, 110b communicating via a traditional cable, the host devices 110a, 110b instead communicate with their respective transceivers 120, 120b, which then tunnel the data over a high-speed point-to-point serial wireless link 130 at speeds exceeding those that can be achieved using traditional wired communications.

The transceivers 120 operate at low latency and relay transmissions between the host devices 110 at speeds sufficient to enable the host devices 110 to maintain a connection in compliance with the traditionally wired protocol (e.g., USB, HDMI, or DisplayPort). From the perspective of the host devices 110, the connection is the same as if they were connected via a traditional cable. Thus, the host devices 110 need not deviate in operation or design from devices used in conventional wired communications via these protocols.

Taking USB as an example, traditional wireless devices with USB interface terminate the USB protocol in the transceiver and re-encode data into a different wireless protocol for transmission. The traditional wireless devices are visible as nodes (USB hubs, USB devices or USB repeaters) in the USB tree topology. In contrast, a USB tunneling transceiver allows for USB link-layer data traffic to be transmitted without modifications at very low latency and without terminating the USB protocol layers. Hence, such transceiver devices (or tunneling devices) are not visible in the USB topology.

The host device 110 comprises a computer or digital logic that outputs a signal (e.g., data and/or commands) for communicating to another host device 110. In one embodiment, the host device 110 outputs a signal (and/or processes a received signal) according to a communications protocol such as, for example, USB, HDMI, or DisplayPort. For example, in an embodiment configured for USB communications, the host device 110 outputs a USB signal to the transceiver 120 that conforms to the USB protocol in the same manner as if the host device 110 was outputting to another host device 110 without the two transceivers 120 in between. Similarly, the host device 110 receives and processes USB signals received from the transceiver 120 that conform to the USB protocol in the same manner as if the host device 110 was receiving the signals directly from another host device 110. In other embodiments, the host device 110 may communicate in accordance with an HDMI protocol, DisplayPort protocol, or other serial communication protocol and maintain a connection with the other host device 110 in compliance with the serial communication protocol.

The transceiver 120 comprises a transmitter 122, a receiver 124, and a power state machine 126. The transmitter 122 receives data from the host device 110 and transmits the data over the wireless link 130 to a receiver 124 of a different computing system 150. The receiver 124 receives data over the wireless link 130 from a transmitter 122 of another computing system 150 and provides the received data to the host device 110. The power state machine 126 controls the power state of the transceiver 120 by switching the transceiver 120 between a high power state for transmitting high frequency data and one or more low power states as will be described in further detail below. The transceivers furthermore mimic low-power states signaled within the tunneled protocol. In an embodiment, the transceiver 120 is capable of full-duplex communication so that it may transmit and receive data over the wireless link 130 simultaneously.

In one embodiment, the transceivers 120a, 120b are substantially identical devices. Alternatively, the transceivers 120a, 120b are different complementary device types that have similar high level architectures, but differ in certain architectural or operational characteristics as described herein. For example, in one embodiment, the first transceiver 120a comprises first device type configured to operate with a host device 110a embodied as a docking station, while the second transceiver 120b comprises a second device type configured to operate with a host device 110b embodied as a mobile device. In one embodiment, in order to implement full-duplex communication, complementary transceivers 120 of different types have different antenna polarization so that two different transmitter/receiver antenna pairs can simultaneously operate in both directions. For example, the transceiver 120a may have a type X transmit antenna and a type Y receive antenna, while the transceiver 120b has a complementary type Y transmit antenna and a type X receive antenna. Furthermore, transceivers 120 of different types may operate according to different control schemes in order to optimize the power efficiency of one of the transceivers 120 in the pair. For example, when the first transceiver 120a is configured for operating with a docking station and the second transceiver 120b is configured for operating with a mobile device, the transceivers 120a, 120b may operate asymmetrically in order to lower the power consumption of the transceiver 120b hosted by the mobile device at the expense of the transceiver 120b hosted by the docking station. This tradeoff may be desirable because a docking station is typically connected to a continuous power source, while a mobile device depends on a battery with limited power.

In one embodiment, the device type associated with a transceiver 120 (and the operation associated therewith) may be permanently designed into the transceiver 120. Alternatively, a transceiver 120 may be configurable between two or more device types based on a switch or register setting. Architectural and/or operational differences between the different configurations of the transceivers 120a, 120b in a complementary pair are described in further detail below.

In one embodiment, the wireless link 130 comprises a 60 GHz wireless link. The wireless link 130 is limited to short range communications where the transceivers 120 are in very close proximity to each other (e.g., within a few millimeters). Data transmissions over the wireless link 130 may have a data rate of, for example, 6 Gigabits per second or higher.

In one embodiment, the transceiver 120 is embodied as a removable dongle that can couple to a port of the host device 110 (e.g., a USB port, a HDMI port, or a DisplayPort port). In other embodiments, the transceiver 120 is internally coupled to the host device 110 (e.g., via traces on a printed circuit board) or may be fully integrated with the host device 110 (e.g., in an integrated circuit).

The computing system 150 (and the components thereof) may be implemented using analog circuit components, digital logic, software, or a combination thereof. In one embodiment, one or more components of the computing system 150 may be implemented as a processor and a non-transitory computer-readable storage medium storing instructions that when executed by the processor cause the processor to carry out the functions attributed to the components. Alternatively, or in addition, digital components may be implemented as an application specific integrated circuit (ASIC), field-programmable gate array (FGPA), or using a combination of implementations.

Figure 2:
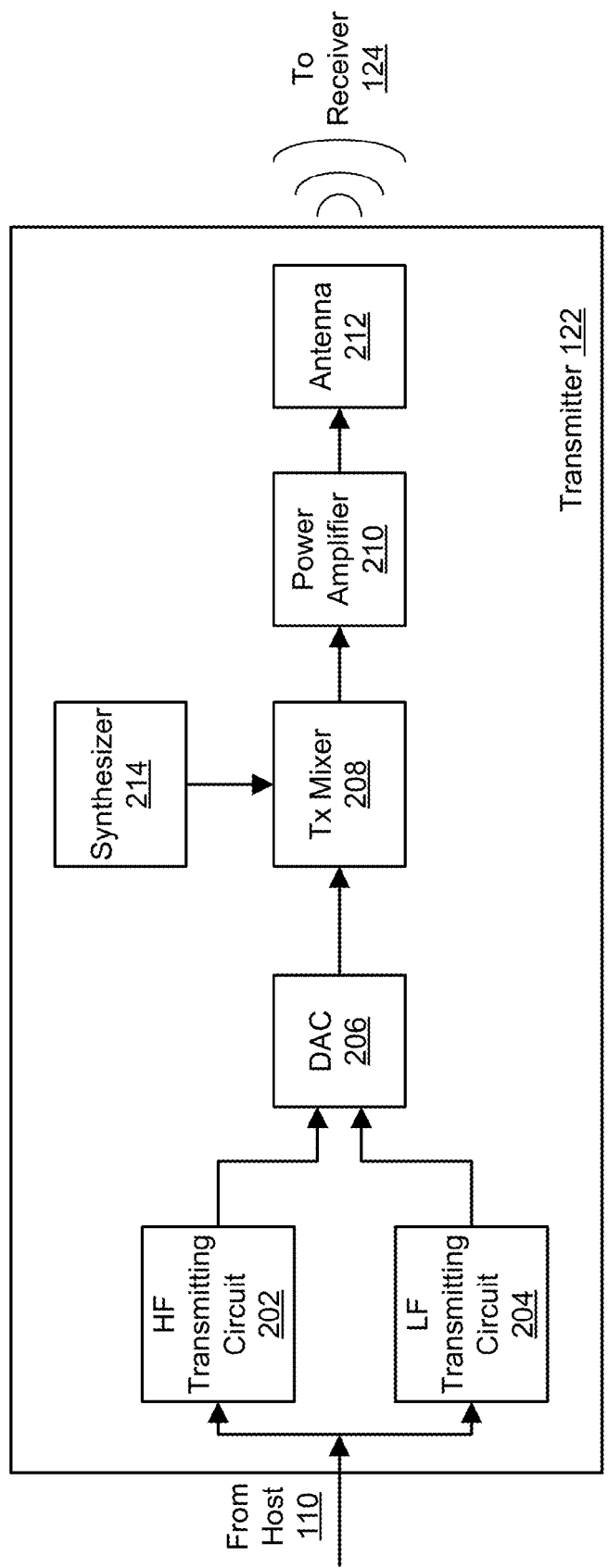
FIG. 2 illustrates an example embodiment of a transmitter of the wireless tunneling system.

FIG. 2 illustrates an example embodiment of a transmitter 122 (e.g., transmitter 122a or transmitter 122b). The transmitter 122 includes a high frequency (HF) transmitting circuit 202, a low frequency (LF) transmitting circuit 204, and a shared transmit data path comprising a digital-to-analog converter (DAC) 206, a transmit (Tx) mixer 208 (herein also referred to as "an up-converter circuit"), a synthesizer 214, a power amplifier 210, and an antenna 212. A high frequency transmit data path comprises the HF transmitting circuit 202 and may operate together with or include the shared transmit data path. Similarly, a low frequency transmit data path comprises the LF transmitting circuit 204 and may operate together with or include the shared transmit data path.

The HF transmitting circuit 202 provides an interface with the host device 110 for receiving digital data, and generates a high data rate (e.g., 6 Gbps) digital baseband signal (herein also referred to as "a first transmit baseband signal"). For example, in one embodiment, the HF transmitting circuit 202 receives serial data conforming to a USB protocol, an HDMI protocol, a DisplayPort protocol, or other communication protocol and generates a high-speed signal suitable for wireless transmission.

The LF transmitting circuit 204 generates a low data rate signal (herein also referred to as "a second transmit baseband signal") that has a substantially lower data rate than the high data rate signal produced by the HF transmitting circuit 202. The low data rate signal typically comprises control signals used to communicate control or state information such as, for example, information for operating in or transitioning between a proximity detection state or a device attachment/detachment state, and other state information used for controlling the power state of the transceiver 120.

The digital-to-analog converter 206 converts the high speed and low speed signals from the HF transmitting circuit 202 and LF transmitting circuit 204 respectively from the digital domain to the analog domain to generate an analog baseband signal. The Tx mixer 208 up-converts the analog baseband signal to a radio frequency signal based on a carrier signal (generated by the synthesizer 214) to generate an up-converted signal. The power amplifier 210 amplifies the up-converted signal to generate an amplified signal (herein also referred to as "a wireless transmit signal") transmitted by the antenna 212 over the wireless link 130. In one embodiment, the power amplifier 210 comprises a multi-stage power amplifier that amplifies the up-converted signal in a manner that meets output power and linearity requirements. As described above, the antenna 212 may be of different type depending on whether the transmitter 122 is a first device type (e.g., for use with a wall-powered dock device) or as second device type (e.g., for use with a battery-powered mobile device).

The power state machine 126 controls the power state of the various components of the transmitter 122 depending on an operational state of the transmitter 122 in order to improve power efficiency of the transmitter 122. For example, because the power consumption of the HF transmitting circuit 202 is relatively high compared to the LF transmitting circuit 204, the power state machine 126 can control the HF transmitting circuit 202 to operate in a low power state or turn off the HF transmitting circuit 202 during a low frequency transmission when the HF transmitting circuit 202 is not being used. During high frequency transmissions, the LF transmitting circuit 204 may be powered down. Furthermore even during proximity detection (as will be described later), since the LF transmitting circuit 204 transmit operations generally happen relatively infrequently, the power state machine 126 can turn off power to the digital-to-analog converter 206, Tx mixer 208, synthesizer 214, and power amplifier 210 during periods when neither the HF transmitting circuit 202 nor the LF transmitting circuit 204 are operational. This duty-cycling of the transmit data path lends itself to lower power consumption when averaged over time.

Figure 3:
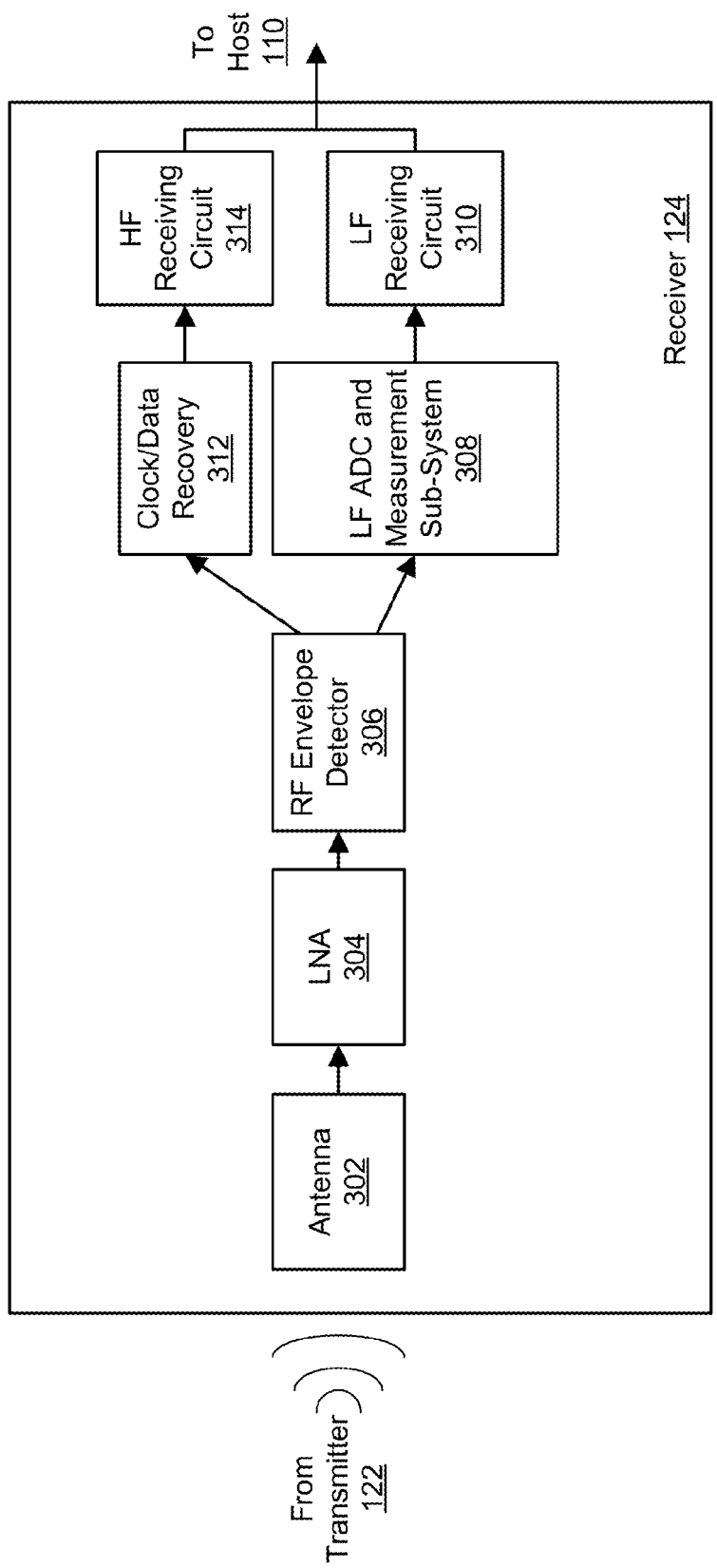
FIG. 3 illustrates an example embodiment of a receiver of the wireless tunneling system.

FIG. 3 illustrates an example embodiment of a receiver 124 (e.g., receiver 124*a* or 124*b*). The receiver 124 includes a shared receive data path comprising an antenna 302, a low noise amplifier (LNA) 304, and a down-converter circuit (e.g., a radio frequency (RF) envelope detector 306); a high frequency receive data path including a clock/data recovery block 312 and a high frequency receiving circuit 314; and a low frequency receive data path including a low frequency analog-to-digital converter and measurement sub-system 308 and a low frequency receiving circuit 310. The high frequency receive data path may operate together with or include the shared receive data path. Similarly, the low frequency receive data path may operate together with or includes the shared receive data path.

The antenna 302 receives a wireless signal (herein also referred to as "a receive wireless signal") via the wireless link 130 which is amplified by the low noise amplifier 304. As described above, the antenna 302 may be of different type depending on whether the receiver 124 is a first device type (e.g., for use with a dock device) or as second device type (e.g., for use with a mobile device). The low noise amplifier 304 provides gain and incorporates automatic gain control to ensure an optimal signal level at the input of the RF envelope detector 306. The RF envelope detector 306 demodulates the amplified wireless signal (or amplified RF signal) by detecting an envelope of the amplified signal to recover a baseband signal (herein also referred to as "a receive baseband signal"). For example, in one embodiment, the RF envelope detector 306 applies a non-linear (e.g., square law) amplification to rectify the amplified RF signal, and then filters out the high-frequency components to provide the baseband signal.

In the high frequency receive data path, the clock/data recovery block 312 recovers a clock signal implicit in the baseband signal and uses the clock signal to recover high speed data. The HF receiving circuit 314 processes the high speed data signal and generates a signal (herein also referred to as "receive data") suitable for interfacing to the host device 110. For example, the HF receiving circuit 314 generates a data signal conforming to the USB protocol, HDMI protocol, DisplayPort protocol, or other data protocol associated with the host device 110.

In the low frequency receive data path, the LF ADC and measurement sub-system 308 converts the baseband signal to a digital representation and provides the digital signal to the LF receiving circuit 310. The LF receiving circuit 310 processes the digital signal to generate a signal representing control (herein also referred to as "a control signal" or "control information") for providing to the power state machine 126 or status information for providing to the host device 110.

The power state machine 126 controls the power state of the various components of the receiver 124 depending on an operational state of the receiver 124 in order to improve power efficiency of the receiver 124. For example, because the power consumption of the HF receiving circuit 314 is relatively high compared to the LF receiving circuit 310, the power state machine 126 can control the HF receiving circuit 314 to operate in a low power state or turn off the HF receiving circuit 314 during a low frequency transmission when the HF receiving circuit 314 is not being used. Similarly, the clock/data recovery block 312 can be powered down during a low frequency transmission. During high frequency transmissions, the low frequency components such as LF ADC and measurement sub-system 308 and LF receiving circuit 310 may be powered down.

The architecture of the low frequency receive data path is well suited for low power operation. In contrast to a conventional receive architecture, the receive data path of the receiver 124 does not include a synthesizer, which typically consumes substantial power in a traditional receiver architecture. Instead, the receiver 124 can recover both the low and high frequency transmissions based on envelope detection, thereby operating at significantly lower power than a traditional receiver. This low-power RF architecture based on on-off keying and using RF envelope detector 306 does not depend on a fixed local oscillator frequency.

FIGS. 4A, 4B, and 4C provide example scenarios in which low frequency signaling can be used to facilitate improved power efficiency in the wireless tunneling system 100. In FIG. 4A, transceivers 120*a*, 120*b* do not have sufficient proximity to each other to enable communication over the wireless link 130. The low frequency transmit and receive data paths (herein also referred to as "a low frequency data path") can be utilized by both the transmitter 122 and receiver 124 to periodically scan for proximity while keeping the high frequency transmit and receive data paths (herein also referred to as "a high frequency data path") off (or in a lower power state). The high frequency data path (which consumes substantially more power) is turned off and is only enabled once proximity is detected.

In FIG. 4B, the transceivers 120*a*, 120*b* have sufficient proximity to each other, but the transceiver 120*b* is disconnected from the host device 110*b* and therefore cannot transmit or receive high speed data. Here, the low frequency data paths can be utilized to periodically send a "KEEP_ALIVE" signal between the transceivers 120*a*, 120*b* to indicate continued proximity without substantial power consumption, while the high frequency data paths are powered down to reduce power consumption. At a much coarser time scale, the HF transmitting circuit 202 and HF receiving circuit 314 may be periodically powered on to detect whether or not the transceiver 120 has been attached to a host device 110 and then powered back down if no attachment is detected.

In FIG. 4C, the transceivers 120*a*, 120*b* have sufficient proximity to each other and are both connected to their respective host devices 110*a*, 110*b*. However, in this scenario, the host devices 110a, 110b are in a low power state and do not have any high speed data to communicate (e.g., a "U3" state for USB hosts). Here, the high frequency data paths may be powered down to reduce power consumption while the host devices 110a, 110b are in the low power state. If either host device 110a, 110b exits the low power state, the low frequency data path can be used to signal a low power exit event to the other transceiver 120 and cause the transceiver 120 to turn on its high frequency data paths to prepare for reception of the high frequency communication.

Figure 5A:
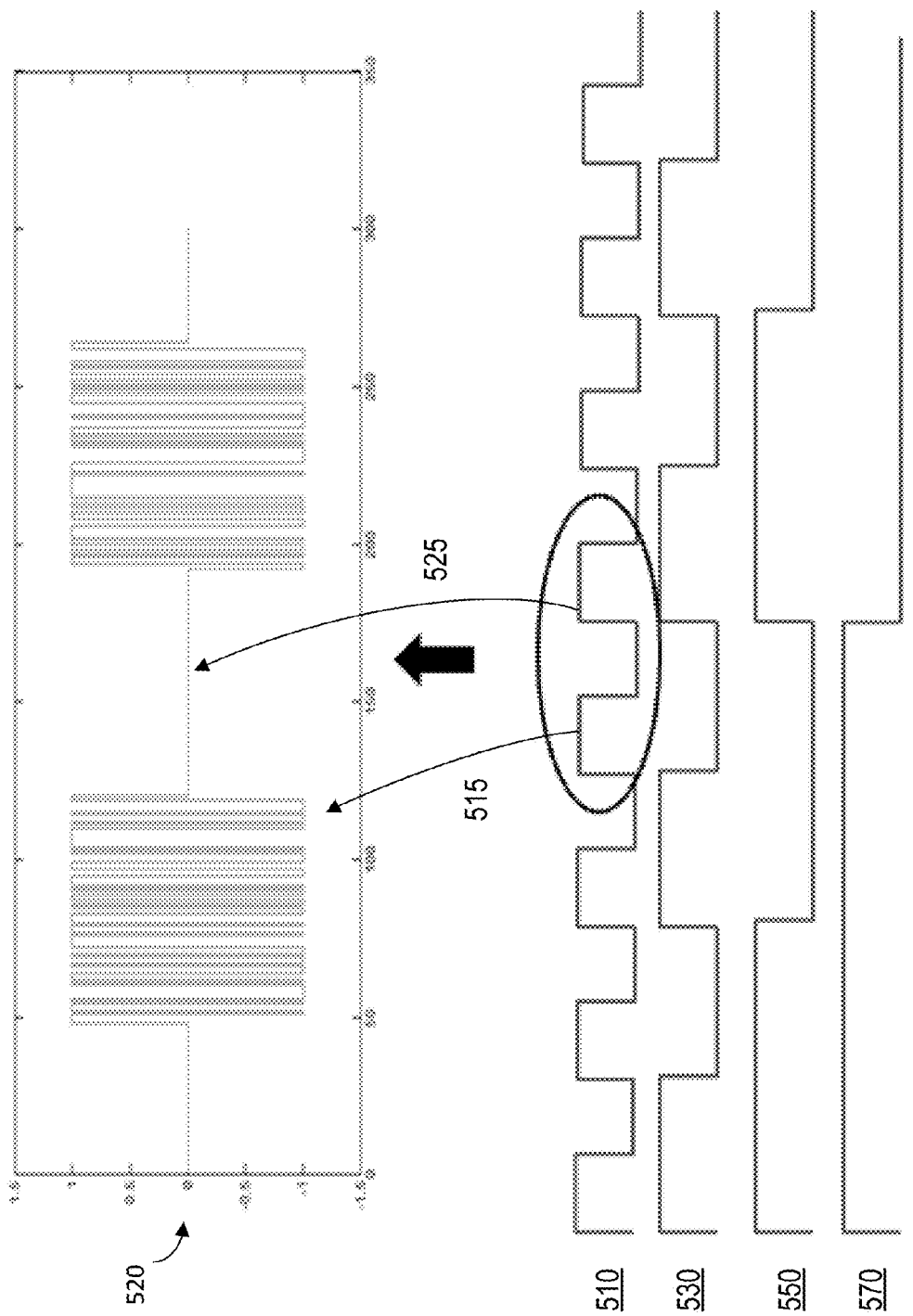
FIG. 5A illustrates an example baseband signal generated from a low frequency transmitting circuit of the transmitter and its envelopes with different on-periods, according to one embodiment.

FIG. 5A illustrates an example transmit baseband signal generated from the LF transmitting circuit 204 of the transmitter 122 and its envelopes with different on-periods, according to one embodiment. In one example, the LF transmitting circuit 204 generates the transmit baseband signal 520 using modified on/off envelope signals (e.g., envelope signals 510, 530, 550, and 570) having different on-periods to encode different control information such as various wake-up events from different low power states. Rather than transmitting a constant HIGH signal during the on-periods of the on/off signal, the transmit baseband signal 520 comprises a constant voltage 525 (e.g., LOW or zero volts) to represent an off-period of the envelope signal and a plurality of pulses 515 having varying pulse widths to represent an on-period of the envelope signal.

Figure 5B:
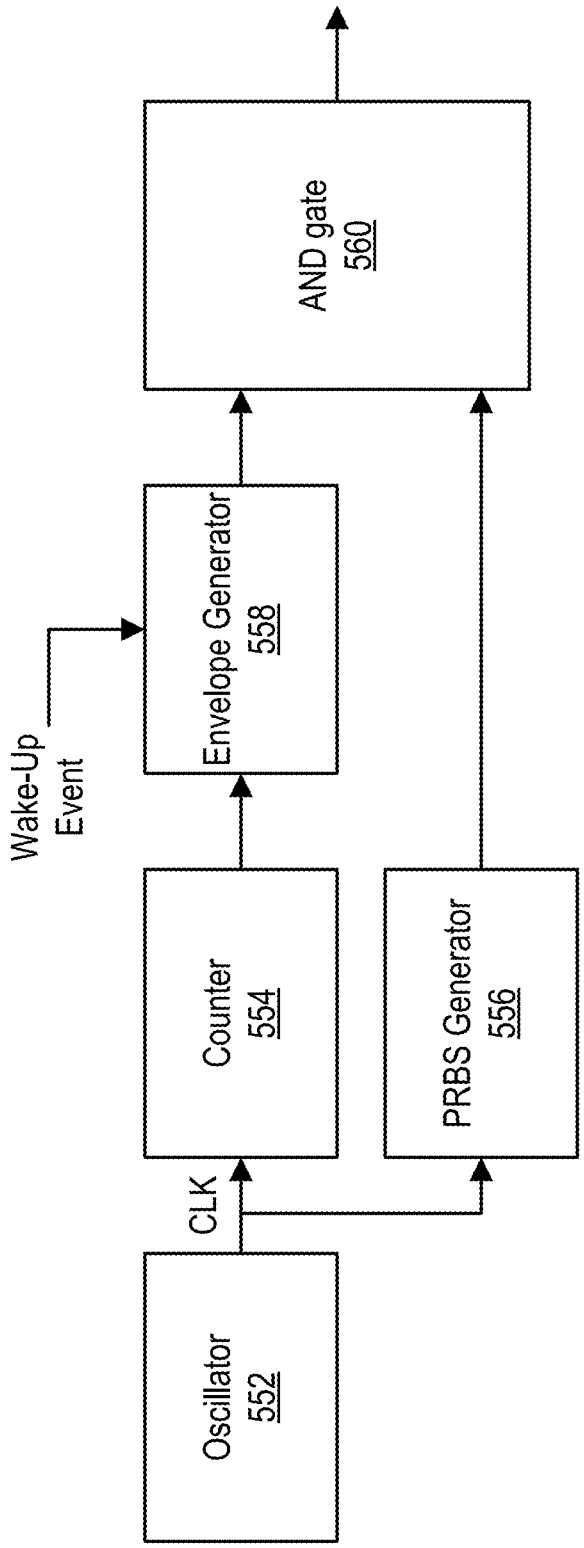
FIG. 5B illustrates an example embodiment of a low frequency transmitting circuit for generating a low data rate baseband signal, according to one embodiment.

FIG. 5B illustrates one example implementation of a low frequency transmitting circuit 204 which includes an oscillator 552 (e.g., a low power RC oscillator operating at approximately 14 MHz with ±10% accuracy), a counter 554, an envelope generator circuit 558, a pseudo random binary sequence (PRBS) generator 556, and an AND logic circuit 560. Together, these components generate the second transmit base band signal 520 encoding the wake-up events for transmission via the low frequency transmitting circuit 204.

The oscillator 552 (for example, a low power RC oscillator) generates a reference clock signal (e.g., a 14 MHz clock signal within ±10% accuracy). The counter 554 counts a predefined number of clock periods (e.g., 36) and outputs a signal to the envelope generator circuit 558 when the count is reached. The envelope generator circuit 558 generates an envelope signal (e.g., one of envelope signals 510, 530, 550, and 570), based on a desired wakeup event and the output of the counter 554. For example, the envelope generator circuit 558 generates the envelope signal in which an on-period of the envelope signal encodes one of the plurality of wake-up events as described in more detail with respect to FIG. 9.

The envelope generator circuit 558 generates an envelope with a period according to a predetermined number of reference clock signal pulses to indicate the different wake-up events. For example, the envelope generator circuit 558 generates the envelope signal 510 having a period with a unit number (e.g., 36) of pulses of the reference clock signal to represent an USB3 U3 exit event. Similarly, the envelope generator circuit 558 generates the envelope signal 530 having a period with two unit numbers (e.g., 72) of pulses of the reference clock signal to represent an USB2 suspend-resume. The envelope generator circuit 558 generates the envelope signal 550 having a period with four unit numbers (e.g., 144) of pulses of the reference clock signal to represent a proximity detect state. Similarly, the envelope generator circuit 558 generates the envelope signal 570 having a period with eight unit numbers (e.g., 288) pulses of the reference clock signal to represent a "KEEP_ALIVE" state. The receiver 124 may be configured to detect the envelope signal 510, 530, 550, 570 within 20 us, 100 us, 100 us, 100 us, respectively as listed in Table 1.

TABLE 1

| Event | Detection Time Less than | Envelope ON/OFF time (in 14 MHz clocks) |
|---|---|---|
| USB3 U3 exit | 20 us | 36 |
| USB2 suspend-resume | 100 us | 72 |
| Keep Alive | 100 us | 288 |
| Proximity Detect | 100 us | 144 |

The pseudo random binary sequence generator 556 generates a plurality of pulses 515 having pseudo-randomly varying pulse widths. In one implementation, the pseudo random binary sequence generator 556 is implemented as an XOR based 11 bit linear feedback shift register.

The AND logic circuit 560 receives the envelope signal from the envelope generator circuit 558 and the plurality of pulses 515 from the pseudo random binary sequence generator 556 and combines the signals using the logical AND operation to generate the second transmit baseband signal 520. In this configuration, the AND logic circuit 560 generates the second transmit baseband signal 520 by outputting a constant voltage 525 to represent an off-period of the envelope signal and by outputting the plurality of pulses 515 to represent the on-period of the envelope signal.

Beneficially, the low frequency transmitting circuit 204 generating the transmit baseband signal using the envelope signal as described above enables large power savings. Specifically, during the off-period of the envelope signal, the Tx mixer 208 and the power amplifier 210 do not generate the transmit wireless signal. Hence, duty-cycling of the transmit data path lends itself to lower power consumption when averaged over time.

By implementing PRBS pulses during the on-period of the envelope signal, tones in the wireless spectrum can be dispersed to reduce interference to other wireless bands. For example, the wireless spectrum using the PRBS pulses may be compliant with a spectral mask requirement in the 60 GHz band.

Figure 6:
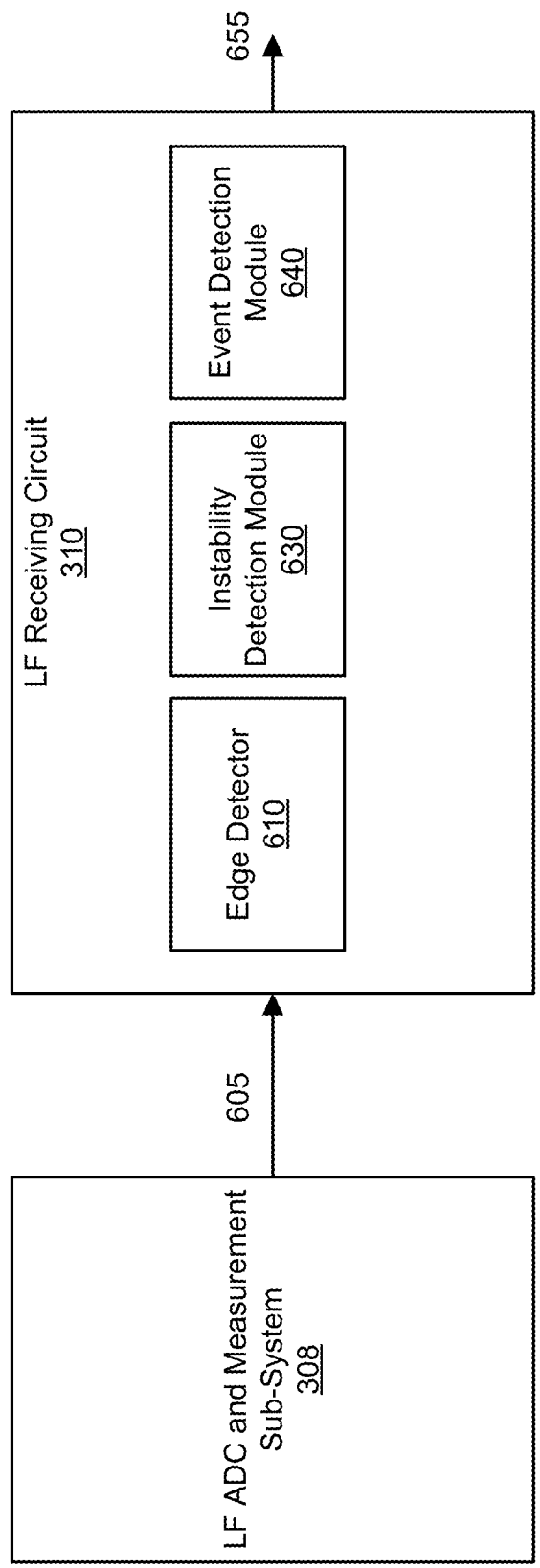
FIG. 6 illustrates an example embodiment of components in a low frequency receiving circuit of the receiver.

FIG. 6 illustrates an example embodiment of the LF receiving circuit 310. The LF receiving circuit 310 receives the receive baseband signal 605 (or a digital representation of it from the LF ADC measurement sub-system 308) and generates the control signal 655 or the status information. In one embodiment, the LF receiving circuit 310 includes an edge detector 610, an instability detection module 630, and an event detection module 640. These components may be implemented using analog circuit components, digital logic, software, or a combination thereof.

In one embodiment, the LF receiving circuit 310 determines an on period of the receive baseband signal 605, and generates the control signal 655 or the status information based on the determined on period of the receive baseband signal 605. The on period of the receive baseband signal 605 may correspond to an on period of an envelope signal of a transmit baseband signal 520 generated from another transceiver.

The LF receiving circuit 310 implements a detection algorithm based on measurement of signal power obtained from a LF ADC and measurement sub-system 308 (e.g., a 10-bit SAR (sample and hold) ADC) at the output of the RF envelope detector 306. In one implementation, 6 bits out of 10 ADC bits may be used for measurement.

The LF ADC and measurement sub-system 308 operates at a frequency of the reference clock signal in the low frequency transmitting circuit 204 (e.g., 14 MHz) and each output bit of the LF ADC and measurement sub-system 308 may be measured every one half unit of samples (e.g., 16 samples), rendering the sample rate of (14/16) MHz.

The edge detector 610 detects an edge of the receive baseband signal 605 (or an output of the ADC). In order to start the detection process in the middle of the pulse, the first positive edge is ignored and the detection starts from the first negative edge. When the edge of the sequence is higher than the detection threshold, the edge can be detected. Both the negative to positive edge intervals and positive to negative edge intervals are measured and average intervals are obtained. To improve the stability of detection, the detected edge of the sequence is smoothed and compared with the amplitude threshold. The ones over the amplitude threshold are sent to the instability detection module 630.

The instability detection module 630 determines whether the measurement from the receive baseband signal 605 is stable.

The event detection module 640 compares on-period measurements against the threshold for each sequence type and according to the output of the instability detection module 630, determines the on period of the receive baseband signal 605. The event detection module 640 may also determine which kind of wakeup sequence is detected based on the determined pulse width. According to the determined on period of the receive baseband signal 605 or the kind of wake up sequence detected, the event detection module 640 generates the control signal 655 or the status information.

Figure 7:
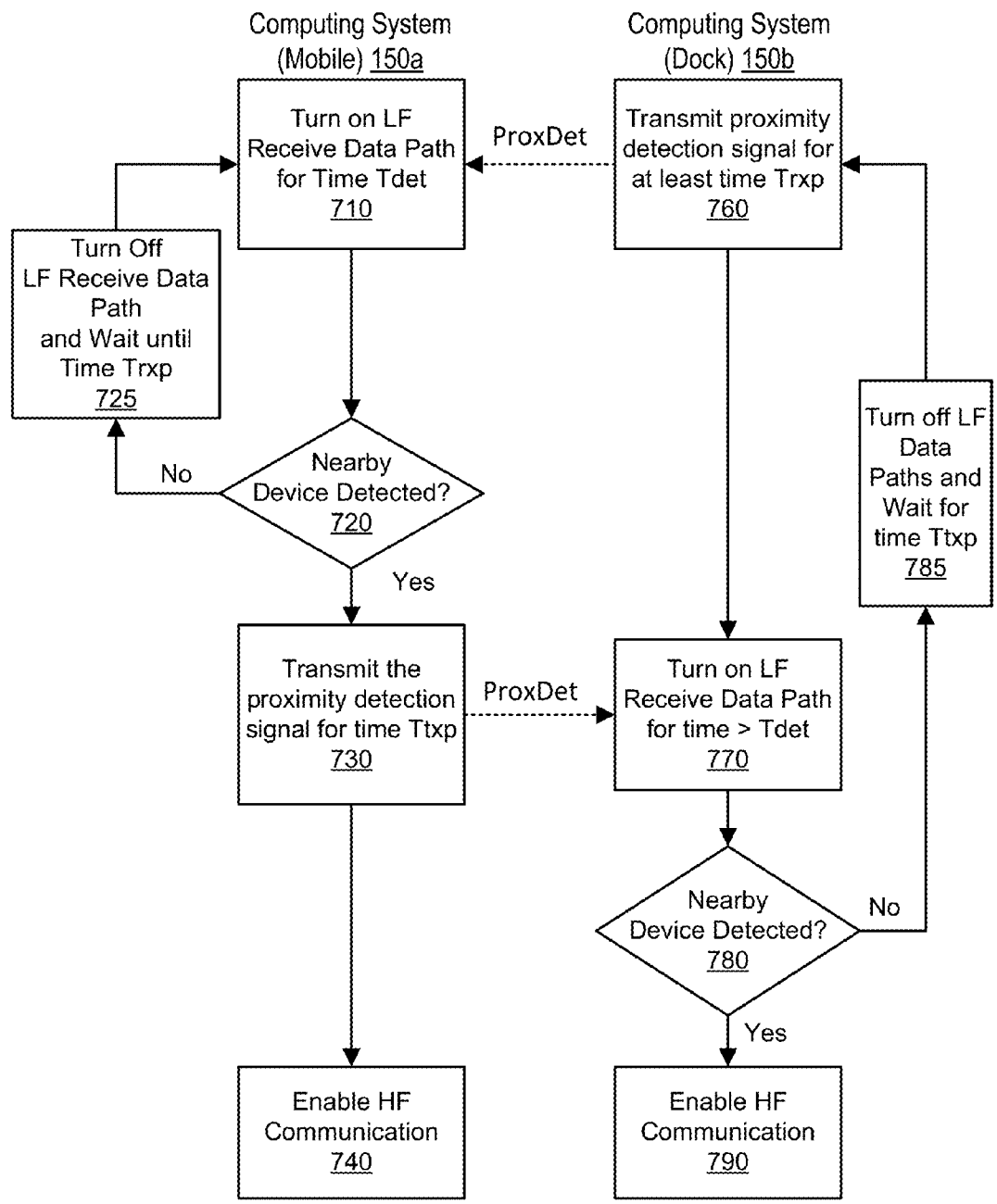
FIG. 7 illustrates an example interaction diagram of two computing systems performing a proximity detection, according to one embodiment.

FIG. 7 illustrates an example interaction diagram of two computing systems 150a, 150b performing a proximity detection in the proximity detection state, according to one embodiment. The proximity detection is performed by the computing system 150a and the computing system 150b to determine whether the two computing systems 150a and 150b are within a predetermined proximity. In this example, the computing system 150a is of a second device type (e.g., a battery-powered mobile device), and the computing system 150b is of a first device type (e.g., a wall-powered dock device). Alternatively, the computing systems 150a and 150b may be of any combination of device types.

In the proximity detection state, the computing system 150a (e.g., a mobile device) periodically enables (i.e., turns on) 710 the low frequency receive data path for Tdet time in an attempt to detect proximity detection signal (ProxDet). The computing system 150a determines 720 whether a nearby device is detected based on whether or not the receive proximity detection signal (ProxDet) is successfully detected. Responsive to not receiving any receive proximity detection signal (i.e., not detecting any nearby device), the computing system 150a disables 725 the LF receive data path and waits until a receiver sleep time Trxp ends. After the receiver sleep time Trxp, the computing system 150A re-enables 710 the LF receive data path to again search for a possible nearby device. Responsive to detecting the receive proximity detection signal during the detection time Tdet, the low frequency transmitting circuit 204 generates a transmit proximity detection signal (ProxDet), and transmits 730 the proximity detection signal for Ttxp time to indicate to the nearby device that it received the proximity detection signal and is available to connect. After transmitting the proximity detection signal, the power state machine 126 transitions the transceiver 120 to the high power state, and enables 740 communications at a high data rate.

In the proximity detection state, the computing system 150b (e.g., a dock device) periodically enables the low frequency transmit data path and transmits 760 a proximity detection signal (ProxDet) for at least the receiver sleep time Trxp. After transmitting the proximity detection signal, the computing system 150b enables 770 the low frequency receive data path for Tdet time in an attempt to search for a proximity detection signal (ProxDet) generated by the computing system 150a. The computing system 150b determines 780 whether a nearby device is detected based on whether or not it detects the receive proximity detection signal. Responsive to not receiving any receive proximity detection signal (i.e., not detecting any nearby device) during Tdet time, the computing system 150b disables the LF transmit and receive data paths and waits 785 until a transmitter sleep time Ttxp ends. Preferably, the value of Ttxp is much larger than Trxp and Tdet. After the transmitter sleep time Ttxp, the computing system 150b again transmits 760 the transmit proximity detection signal. Responsive to detecting the receive proximity detection signal during the detection time Tdet, the power state machine 126 transitions the transceiver 120 to the high power state, and enables 790 communications at a high data rate.

In one aspect, the proximity detection scheme in FIG. 7 is designed such that the power consumption for computing system 150a is less than that of the computing system 150b. Specifically, prior to detecting the nearby device, the computing system 150b periodically enables LF transmit data path, whereas the computing system 150a periodically enables LF receive data path, where transmit operations may consume more power than receive operations.

Figure 8:
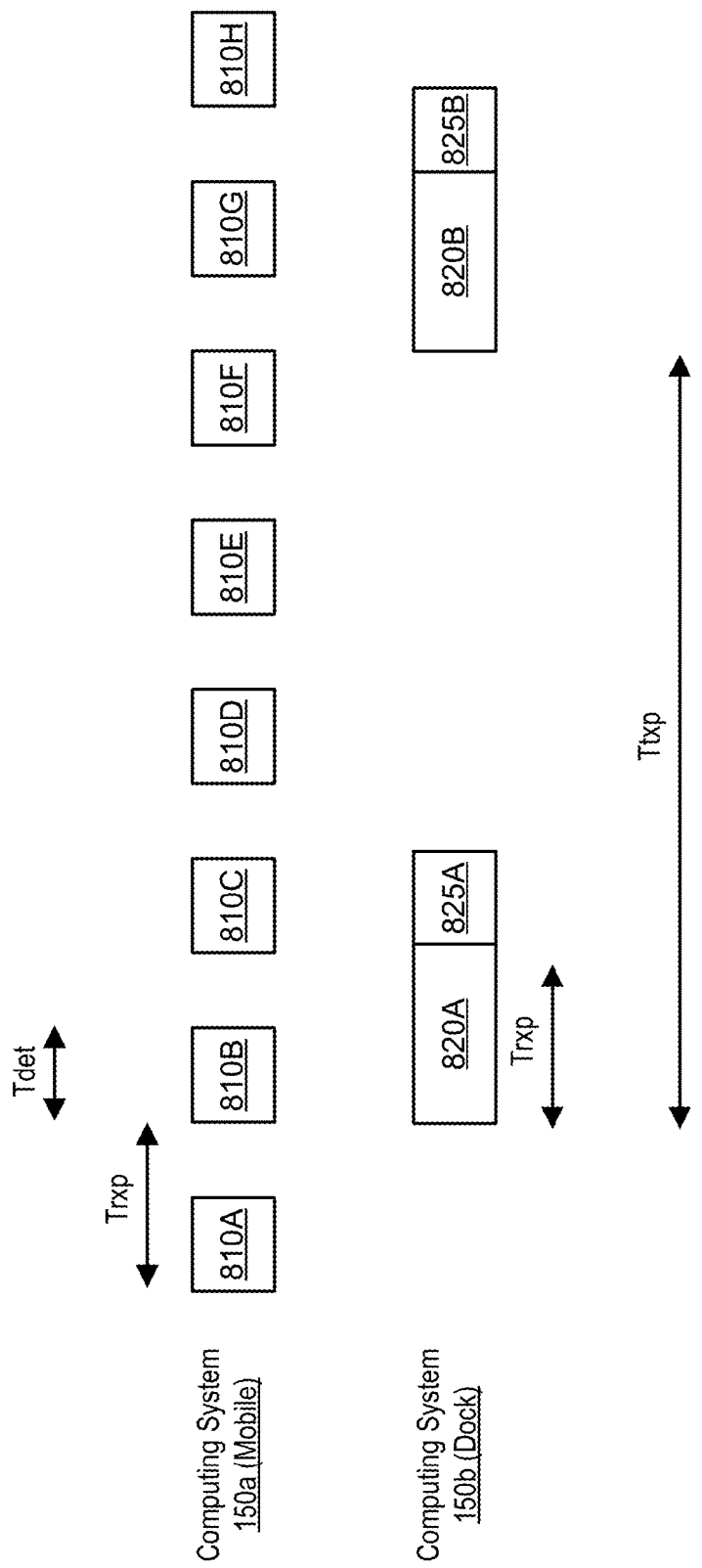
FIG. 8 illustrates an example timing diagram of two computing systems performing a proximity detection, according to one embodiment.

FIG. 8 illustrates an example timing diagram of two computing systems 150a, and 150b performing a proximity detection, according to one embodiment. The computing systems 150a and 150b periodically perform the proximity detection, according to the power state machines 126.

The computing system 150a (e.g., the mobile device) periodically turns on the LF receive data path during time periods 810A, 810B . . . 810H for the detection time Tdet. In case the computing system 150b is not nearby, the computing system 150a is not able to receive a receive proximity detection signal from the computing system 150b, and the LF receive data path of the computing system 150a is disabled until the receiver sleep time Trxp ends. The computing system 150a periodically searches for a receive proximity detection signal during time periods 810 until detecting the computing system 150b within the predetermined proximity.

The computing system 150b (e.g., the dock device) periodically enables the LF transmit data path during time periods 820A, 820B and transmits a transmit proximity detection signal for at least the receiver sleep time Trxp time. Each time after transmitting the transmit proximity detection signal, the computing system 150b searches for a receive proximity detection signal generated in response to the transmit proximity detection signal during time periods 825A, 825B respectively for the detection time Tdet. If the computing system 150b fails to detect the receive proximity detection signal, it disables the LF transmit and receive data paths for transmitter sleep time Ttxp, and retransmits the transmit proximity detection signal. If the computing system 150b detects the receive proximity detection signal, the computing systems 150a and 150b establish a wireless link 130 and enables high data rate communication.

Beneficially, by performing proximity detection asymmetrically as described with respect to FIGS. 7 and 8, low power consumption for both the computing systems 150a and 150b can be achieved. For the first device type (e.g., a dock device), the computing system 150b transmits a transmit proximity detection signal and searches for a response periodically according to a long transmitter sleep time Ttxp to reduce power consumption. For example, the transmitter sleep time Ttxp (e.g., 1 s) is significantly longer than a sum of the detection time Tdet (e.g., 3.7 ms) and the receiver sleep time Trxp (e.g., 10.05 ms). The transmit time for computing system 150a is made long enough to ensure enough settling time of the synthesizer 214 inside the transmitter 122. When the transmit proximity detection signal is generated, the synthesizer 214 of the transmitter 122 takes a relatively long settling time to generate a proper carrier frequency. With a long transmitter sleep time Ttxp, power hungry components in the transmitter 122 of the first device type can be disabled for a long time. Hence, the large value of transmitter sleep time Ttxp lends itself to duty-cycling factors with low average power consumption.

For a second device type (e.g., a mobile device), the computing system 150a searches for a receive proximity detection signal periodically according to a receiver sleep time Trxp. The receiver sleep time Trxp is less than the transmitter sleep time Ttxp, therefore the computing system 150a is more frequently turned on. Unlike the computing system 150b, the computing system 150a more frequently enables the receiver 124 that eschews the power hungry high frequency synthesizer, and seldom enables the transmitter 122. As a result, the second device type can perform frequent receive operations without dissipating large power consumption.

In one embodiment, the computing system 150a and/or 150b may include a mechanical switch to enter the high power state. For example, the mechanical switch may be triggered when the computing systems 150a and 150b are in close proximity (e.g., physically connected). The mechanical switch in the computing system 150a or 150b may be coupled to a reset pin that forces the computing system 150a or 150b to search for nearby devices and to establish the wireless link 130 within the detection time Tdet. Furthermore, the power state machines 126 of each of the computing systems 150a and 150b enter the high power state after detecting proximity.

Figure 9:
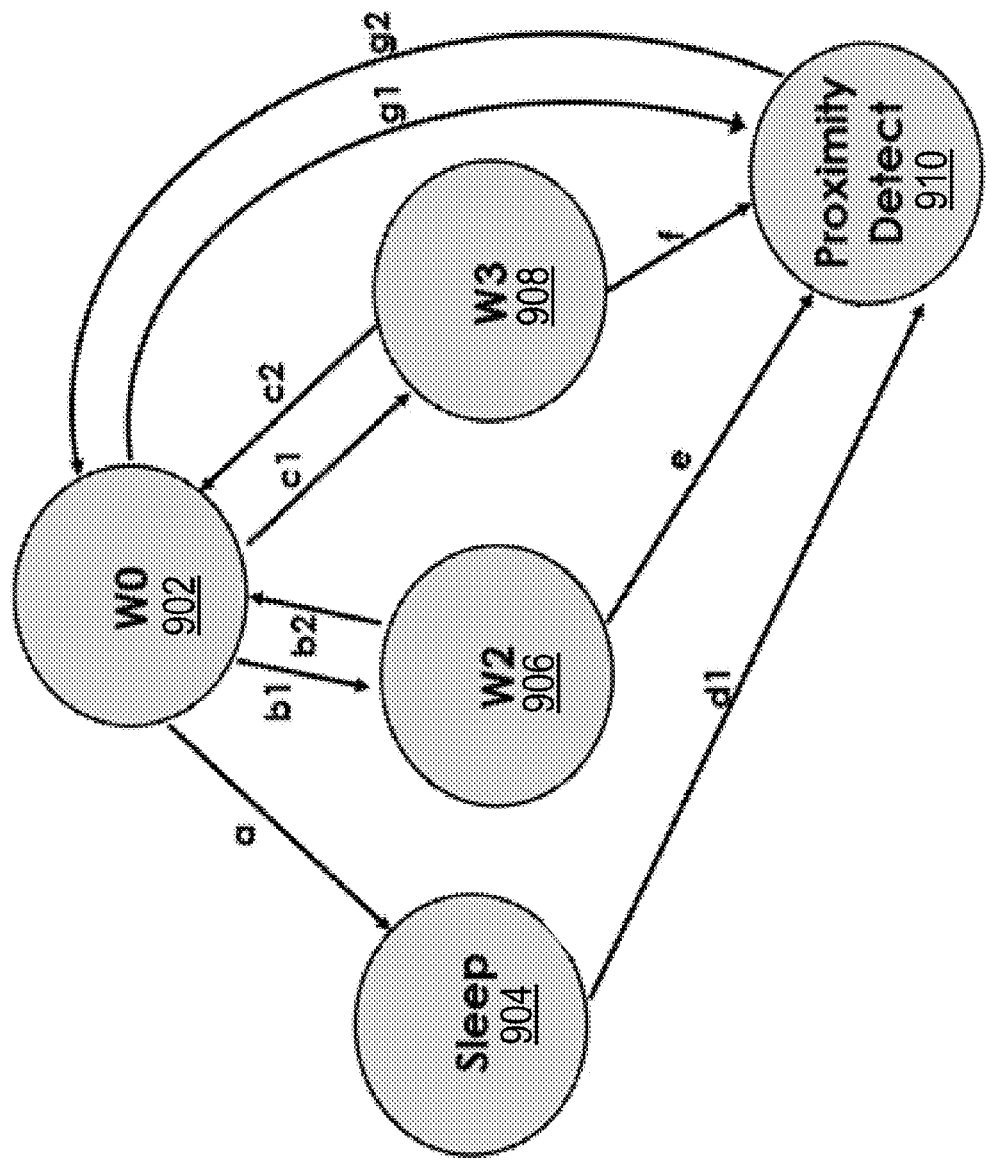
FIG. 9 illustrates an example state transition diagram of a wireless tunneling system capable of tunneling USB data, according to one embodiment.

FIG. 9 illustrates an example state transition diagram for a wireless tunneling system capable of tunneling USB data, according to one embodiment. In this embodiment, five possible power states are available: a W0 state 902, a W2 state 906, a W3 state 908, a Proximity Detect state 910, and a Sleep state 904. The W0 state 902 represents the high power state in which the high frequency transmitting circuit 202, high frequency receiving circuit 314, and associated components are enabled, and the transceiver 120 is actively transmitting, or is available and ready to transmit, high frequency serial data (e.g., USB data).

In the W0 state, the high frequency transmitting circuit 202 and the high frequency receiving circuit 314 are turned on and the transceiver 120 may actively tunnel USB data. If proximity to the other device is lost, the transceiver 120 transitions to the Proximity Detect state. In the Proximity Detect state 910, the high frequency transmitting circuit 202 and high frequency receiving circuit 314 are turned off. The low frequency transmitting circuit 204 and low frequency receiving circuit 310 are turned on to periodically check for proximity to another device as described above with respect to FIGS. 7-8 and are turned off when not being used. A transceiver pair 120a and 120b may enter the Sleep state 904 from the W0 state if proximity detection is successful but the host device 110 is determined to be not attached (as described in the example of FIG. 4B). This determination is made in the W0 state 902. In the Sleep state 904, only "always-on" blocks are running and other components are turned off for power efficiency. The transceiver remains in the Sleep state 904 for a pre-defined time, and then goes back to the Proximity Detect State 910 to make sure that wireless proximity is maintained. If a nearby device is detected, the transceiver 120 transitions back to the W0 state 902 in which attachment of the host device is checked. The W2 and W3 states 906, 908 are entered when a transceiver pair 120a/120b is in wireless proximity, the host devices 110a/110b are in attached state, but the host devices 110 are in a low power state or are not actively communicating data (as described in the example of FIG. 4C). For example, the W2 state 906 is entered when the host device 110 is in a "U2" low-power state of USB3.0 Superspeed, and the W3 state 908 is entered when the host device 110 is either in "U3" state of USB3.0 Superspeed or in "Suspend" state of USB2.0 Highspeed.

Each arc in FIG. 9 represents a possible transition between states. The conditions for transitioning between the states are summarized in Table 2 and described in more detail below.

TABLE 2

| ARC | Local device requirements | Remote device requirements |
|---|---|---|
| a | USB2.0 disconnected and USB3.0 disabled | proposed_link_state == SLEEP |
| b1 | USB2.0 disconnected or suspended and USB3.0 in U2 state. | proposed_link_state == W2 |
| b2 | USB2.0/USB3.0 wakeup event locally or remotely | n/a |
| c1 | USB2.0 disconnected or suspended and USB3.0 in U3 state | proposed_link_state == W3 |
| c2 | USB2.0/USB3.0 wakeup event locally or remotely | n/a |
| d1 | Sleep timer times out | n/a |
| e | Wireless keep-alive signal not seen for N seconds | n/a |
| f | Wireless keep alive signal not seen for N seconds | n/a |
| g2 | Into W0: Proximity is detected | n/a |
| g1 | HF wireless Link is lost by HF synchronization state machine. | n/a |

Transitions out of the W0 state 902 (e.g., via arcs a, b1, c1, and g1) depend both on the state of the local transceiver as well as the state of the remote transceiver in proximity to the local transceiver. In order to communicate the state of the local device to the remote device, and vice versa, a signal proposed_link_state is periodically transmitted between the devices when in the W0 state 902 indicating the transition to a new state dictated by the local device conditions. For example, in one embodiment, the signal proposed_link_state is a 2-bit signal encoding a state advertised by the local device based on its conditions (e.g., 0b00 represents W0, 0b01 represents W2, 0b10 represents W3, and 0b11 represents Sleep). The signal proposed_link_state is periodically updated and exchanged over the wireless link when in the W0 state 902.

A device advertises a transition to the Sleep state 904 (arc a) when it detects that the host device 110 is disabled or disconnected. The device advertises a transition to the W2 state 906 (arc b1) when it detects that USB2.0 has disconnected or suspended and USB3.0 has gone into U2 low-power state. The device advertises a transition to the W3 state 908 (arc c1) when it detects that USB2.0 has disconnected or suspended and USB3.0 has gone into U3 state. The device advertises a transition to the Proximity Detect state 910 when the HF wireless link (i.e., a wireless link 130 using high frequency transmit and receive data paths) is lost.

The state change out of W0 occurs only after both sides of the wireless link 130 advertise the same low power state (e.g., SLEEP, W2, or W3). Otherwise, both devices remain in the W0 state 902. In the W0 state 902 the value of proposed_link_state is transmitted periodically. For complete handshake, the value of remote proposed_link_state is also communicated periodically back to the remote device. This handshake addresses the case when the HF wireless link is lost during the attempt to enter a low power state. When the local and remote devices both advertise the same low power state, the devices each transition to that state.

Exiting from the W2 state 906 to the W0 state 902 (arc b2) is triggered by an upstream or downstream host device sending an exit event. For example, in USB3.0, the exit event may comprise a U2 exit LFPS (Low Frequency Periodic Signaling) to a wireless device. In order for the W2 exit to occur, the wireless device transmits back a handshake LFPS with low enough latency to meet the requirements of the underlying serial protocol (e.g., 2 ms for USB3.0 links). In one implementation, the fast W2 exit is facilitated by keeping all phase-locked loops (PLLs) powered when operating in the W2 state 906. The W2 exit sequence is now described for a USB3.0 link.

Figure 10:
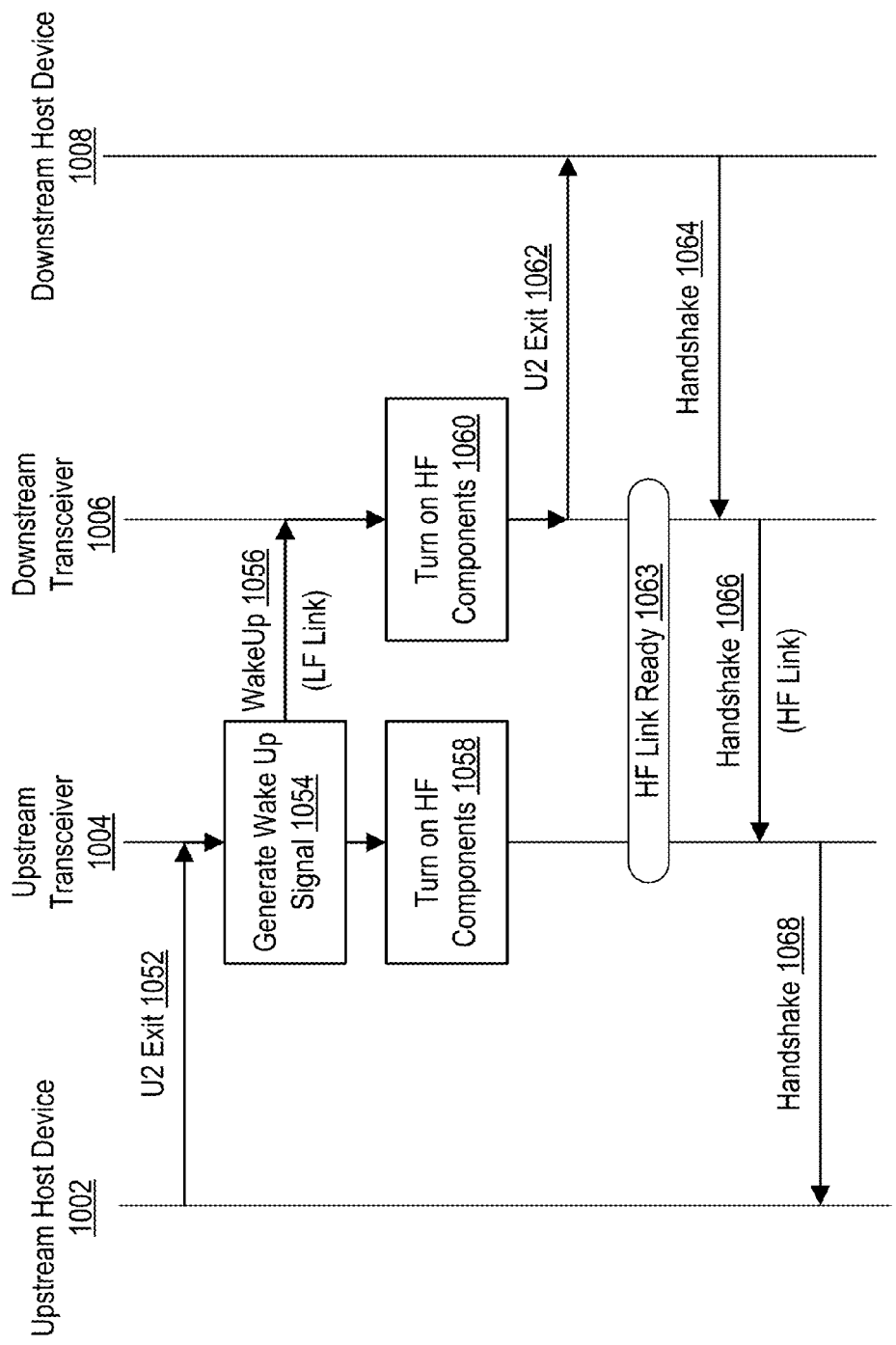
FIG. 10 illustrates an example interaction diagram showing a process for a W2 exit event in a USB wireless tunneling system, according to one embodiment.

FIG. 10 illustrates an embodiment of a process for a transition from the W2 state 906 to the W0 state 902. Initially, both the upstream host device 1002 and the downstream host device 1008 are in the low-power USB3.0 U2 state, and the upstream transceiver 1004 and the downstream transceiver 1006 are both in the low-power W2 state 906. The upstream host device 1002 transmits 1052 a U2 exit event to the upstream transceiver 1004 using LFPS. The upstream transceiver 1004 detects the exit event and generates 1054 a USB wakeup event for transmission by the LF transmitting circuit 204. The upstream transceiver 1004 transmits 1056 the USB wakeup event over the LF wireless link (i.e., a wireless link 130 using a low frequency data path), and then turns on 1058 the HF data components. The downstream transceiver 1006 detects the USB wakeup via the LF receiving circuit 310 and turns on 1060 the HF receiving components. The downstream transceiver 1006 then transmits 1062 the U2 exit event to the downstream host device 1008 using LFPS. Once the full-duplex high frequency wireless link is available 1063, the downstream host device 1008 provides 1064 a LFPS handshake to the downstream transceiver 1006 via LFPS. Depending on the response time, this step can occur earlier in the process, but generally occurs with enough margin against a handshake timeout (e.g., 2 ms in USB3.0). The downstream transceiver 1006 transmits 1066 the handshake via LFPS to the upstream transceiver 1004 using HF wireless link. The upstream transceiver 1004 then provides 1068 the handshake to the upstream host device 1002 via LFPS before the handshake timeout occurs.

Exiting the W3 state 908 to the W0 state 902 (arc c2) is triggered by an upstream or downstream device sending either an exit event or a resume signal (e.g., a USB3.0 U3 exit sent via LFPS or USB2.0 RESUME signal). As with the W2 exit described above, the transceivers operate to transmit handshake LFPS within the handshake timeout period (e.g., 10 ms for U3 exit or RESUME within 20 ms). Exiting from W3 state 908 generally takes longer than from the W2 state 906 due to the time for the PLLs to settle. The W3 exit sequence is otherwise similar to the W2 exit sequence described above.

The Sleep state 904 is entered from W0 state 902 (arc a) when it is determined that both USB3.0 is disabled and USB2.0 is disconnected. Upon entering the Sleep state 904, all components (except for certain "always on" components) are turned off. After a SLEEP_TIME (e.g., 1 second), the state switches to the Proximity Detect state 910 (arc d1). If proximity is detected in the Proximity Detect state, the device transitions to the W0 state 902 (arc g2). If the transceiver 120 is still detached from the host 110, the state machine 126 will again transition back to the Sleep state 904. Thus, device attachment polling is implemented through the transitions from the W0 state 902 (detect if host is connected or disconnected), the Sleep state 904 (wait for SLEEP_TIME to expire), and the Proximity Detect state 910 (determine if proximity exists to another device, and if so, go back to the W0 state 902).

During W2 and W3 low-power states 906, 908, the wireless devices may lose proximity. Upon entering W2 or W3 states 906, 908, both upstream and downstream wireless devices start a timer that count up to a predefined value (e.g., 500 ms). When the predefined count is reached, the upstream device transmits a wireless "keep-alive" signal and resets the counter. Upon receiving the keep-alive signal, the downstream device resets its counter, waits another predefined period, and then transmits the wireless keep-alive signal. When either the upstream or downstream device misses two consecutive keep-alive signals, the device enters the Proximity Detect state 910 (arcs e, f).

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

What is claimed is:

1. A full-duplex transceiver device for wirelessly tunneling communications between a first host device and a second host device while maintaining compliance of the communications between the first and second host devices with a wired communication protocol, the transceiver device comprising:

a transmitter including:

a high frequency transmitting circuit operational in a high power state to receive transmit data from the first host device and to encode the transmit data in a first transmit baseband signal at a first data rate, the transmit data targeted for the second host device and compliant with the wired communication protocol, the high frequency transmitting circuit disabled in one or more low power states, a low frequency transmitting circuit operational in the one or more low power states to generate a second transmit baseband signal at a second data rate lower than the first data rate, the second transmit baseband signal comprising control information, and an up-converter circuit configured to:

receive the first transmit baseband signal and modulate the first transmit baseband signal onto a carrier signal to generate a first transmit wireless signal when in the high power state, and receive the second transmit baseband signal and modulate the second transmit baseband signal onto the carrier signal to generate a second transmit wireless signal when in the one or more low power states;
a receiver including:
a down-converter circuit configured to receive a receive wireless signal and to demodulate the receive wireless signal to generate a receive baseband signal,
a high frequency receiving circuit operational in the high power state to receive the receive baseband signal, the high frequency receiving circuit configured to decode the receive baseband signal to obtain receive data for providing to the first host device, the receive data compliant with the wired communication protocol, the high frequency receiving circuit disabled when in the one or more low power states, and
a low frequency receiving circuit operational in the one or more low power states to:
receive the receive baseband signal,
generate a control signal based on control information in the receive baseband signal, and
determine an on-period of an envelope of the receive baseband signal based at least in part on an edge of the receive baseband signal; and
a state machine configured to:
control switching of the transceiver device between the high power state and the one or more low power states based in part on the control signal, and
control an operation state of the transceiver device based at least in part on a pulse width of the on-period of the envelope of the receive baseband signal.

2. The transceiver of claim 1, wherein the low frequency transmitting circuit comprises:
an envelope generator circuit configured to generate an envelope signal in which an on-period of the envelope signal encodes one of a plurality of wake-up events;
a pseudo random binary sequence generator configured to generate a plurality of pulses having pseudo-randomly varying pulse widths; and
a logic circuit configured to generate the second transmit baseband signal by outputting a constant voltage to represent an off-period of the envelope signal and by outputting the plurality of pulses to represent the on-period of the envelope signal.

3. The transceiver of claim 1, wherein the state machine in a proximity detection state periodically enables the low frequency transmitting circuit and the low frequency receiving circuit to perform a proximity detection sequence to detect another transceiver device within a predetermined proximity.

4. The transceiver of claim 3, wherein the state machine enters the high power state responsive to detecting another device within the predetermined proximity.

5. The transceiver of claim 3,
wherein the transceiver is operational in the proximity detection state to periodically enable the low frequency receiving circuit for a predetermined time period to search for a receive proximity detection signal, and
wherein the transceiver is further configured to, responsive to detecting the receive proximity detection signal during the predetermined time period, generate, by the low frequency transmitting circuit, a transmit proximity detection signal, and transition, by the state machine, the transceiver to the high power state.

6. The transceiver of claim 3,
wherein the transceiver is operational in the proximity detection state to periodically enable the low frequency transmitting circuit for a predetermined time period to generate a transmit proximity detection signal, and to enable the low frequency receiving circuit for another predetermined time period to search for a receive proximity detection signal generated in response to the transmit proximity detection signal, and
wherein, responsive to detecting the receive proximity detection signal, the transceiver is further configured to transition, by the state machine, the transceiver to the high power state.

7. The transceiver of claim 1, further comprising:
a mechanical switch activated based on physical proximity to a second transceiver device, the mechanical switch when activated to perform a reset that causes the transceiver to initiate a proximity detection process to detect the second transceiver.

8. The transceiver of claim 1, wherein, the transceiver is further configured to:
detect, when operating in the high power state, a detachment of the transceiver from the first host device;
responsive to detecting the detachment, enter a sleep state;
after a predefined time period, transition to a proximity detection state to determine if the transceiver is within proximity of another device; and
responsive to detecting proximity of the transceiver to the first host device, transitioning to the high power state.

9. The transceiver of claim 8, wherein when operating in a detached host low power state, transitioning to a proximity detection state responsive to failing to receive a keep-alive signal at the low frequency receiving circuit within a predefined time period.

10. The transceiver of claim 1, wherein the wired communication protocol is a Universal Serial Bus protocol.

11. A method for wirelessly tunneling communications between a first host device and a second host device while maintaining compliance of the communications between the first and second host devices with a wired communication protocol using a full-duplex transceiver, the method comprising:
receiving, by a high frequency transmitting circuit when operating in a high power state, transmit data from the first host device;
encoding, by the high frequency transmitting circuit, the transmit data in a first transmit baseband signal at a first data rate, the transmit data targeted for the second host device and compliant with the wired communication protocol;
generating, by a low frequency transmitting circuit when operating in one or more low power states, a second transmit baseband signal at a second data rate lower than the first data rate, the second transmit baseband signal comprising control information;
receiving, by an up-converter circuit, the first transmit baseband signal when in the high power state;
modulating, by the up-converter circuit, the first transmit baseband signal onto a carrier signal to generate a first transmit wireless signal when in the high power state;
receiving, by the up-converter circuit, the second transmit baseband signal when in the one or more power states;
modulating, by the up-converter circuit, the second transmit baseband signal onto the carrier signal to generate a second transmit wireless signal when in the one or more low power states;
receiving, by a down-converter circuit, a receive wireless signal;
demodulating, by the down-converter circuit, the receive wireless signal to generate a receive baseband signal;

decoding, by a high frequency receiving circuit operating in the high power state, the receive baseband signal to obtain receive data for providing to the first host device, the receive data compliant with the wired communication protocol;

generating, by a low frequency receiving circuit operating in the one or more low power states, a control signal based on control information in the receive baseband signal;

controlling, by a state machine, switching between the high power state and the one or more low power states based in part on the control signal;

determining an on-period of an envelope of the receive baseband signal based at least in part on an edge of the receive baseband signal; and controlling an operation state of the transceiver based at least in part on a pulse width of the determined on-period of the envelope of the receive baseband signal.

12. The method of claim 11, further comprising:
generating, by an envelope generator circuit, an envelope signal in which an on-period of the envelope signal encodes one of a plurality of wake-up events;

generating, by a pseudo-random binary sequence generator, a plurality of pulses having pseudo-randomly varying pulse widths; and generating, by a logic circuit, the second transmit baseband signal by outputting a constant voltage to represent an off-period of the envelope signal and by outputting the plurality of pulses to represent the on-period of the envelope signal.

13. The method of claim 11, further comprising:
periodically enabling the low frequency transmitting circuit and the low frequency receiving circuit to detect another transceiver device within a predetermined proximity.

14. The method of claim 13, further comprising:
entering the high power state responsive to detecting another device within the predetermined proximity.

15. The method of claim 13, further comprising:
periodically searching, in a proximity detection state, for a receive proximity detection signal for a predetermined time period; and responsive to detecting the receive proximity detection signal during the predetermined time period, generating a transmit proximity detection signal, and transitioning to the high power state.

16. The method of claim 13, further comprising:
periodically generating, in a proximity detection state, a transmit proximity detection signal for a predetermined time period;

searching, in the proximity detection state, for a receive proximity detection signal generated in response to the transmit proximity detection signal for another predetermined time period; and responsive to detecting the receive proximity detection signal, transitioning to the high power state.

17. The method of claim 11, further comprising:
detecting, when operating in the high power state, a detachment of the transceiver from the first host device;

responsive to the detecting the detachment, entering a sleep state;

after a predefined time period, transitioning to a proximity detection state to determine if the transceiver is within proximity of another device; and responsive to detecting proximity of the transceiver to the first host device, transitioning to the high power state.

18. The method of claim 17, further comprising:
when operating in a detached host low power state, transitioning to a proximity detection state responsive to failing to receive a keep-alive signal at the low frequency receiving circuit within a predefined time period.

* * * * *